US012579615B1

(12) United States Patent
Chen et al.

(10) Patent No.: US 12,579,615 B1
(45) Date of Patent: Mar. 17, 2026

(54) MACHINE-LEARNING MODELS FOR GENERATING A REFINED IMAGE

(71) Applicant: Amazon Technologies, Inc., Seattle, WA (US)

(72) Inventors: Cong Chen, Pittsburgh, PA (US); Maxim Arap, San Jose, CA (US); Cong Phuoc Huynh, Palo Alto, CA (US); Sheng Liu, Bellevue, WA (US); Muhammad Raffay Hamid, Seattle, WA (US); Mohammad Haroon Abuomar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 426 days.

(21) Appl. No.: 18/128,818

(22) Filed: Mar. 30, 2023

(51) Int. Cl.
| | |
|---|---|
| *G06K 9/62* | (2022.01) |
| *G06T 5/50* | (2006.01) |
| *G06T 7/194* | (2017.01) |
| *G06T 7/50* | (2017.01) |
| *G06T 7/90* | (2017.01) |

(52) U.S. Cl.
CPC ................ *G06T 5/50* (2013.01); *G06T 7/194* (2017.01); *G06T 7/50* (2017.01); *G06T 7/90* (2017.01); *G06T 2207/20081* (2013.01); *G06T 2207/20221* (2013.01)

(58) Field of Classification Search
CPC .. G06T 5/50; G06T 7/194; G06T 7/50; G06T 7/90; G06T 2207/20081; G06T 2207/20221
See application file for complete search history.

(56) References Cited

U.S. PATENT DOCUMENTS

| | | | | |
|---|---|---|---|---|
| 10,867,416 | B2 * | 12/2020 | Shen ...................... | G06T 11/00 |
| 2017/0236290 | A1 * | 8/2017 | Sorkine Hornung ... | G06T 7/162 |
| | | | | 382/173 |
| 2021/0042950 | A1 * | 2/2021 | Wantland .............. | G06T 19/006 |

OTHER PUBLICATIONS

Sofiiuk, et al., Foreground-aware Semantic Representations for Image Harmonization. webpage found at: https://www.google.com/url?sa=t&rct=j&q=&esrc=s&source=web&cd=&cad=rja&uact=8&ved=2ahUKEwiS49WNmLqBAxWzIGoFHVIxBPgQFnoECAgQAQ&url=https%3A%2F%2Fopenaccess.thecvf.com%2Fcontent%2FWACV2021%2Fpapers%2FSofiiuk_Foreground-Aware_Semantic_Representations_for_Image_Harmonization_WACV_2021_paper.pdf&usg=AOvVaw3bYSweb7MjCb5SHbFRaPio&opi=89978449, 2021, pp. 1620-1629.
Ranftl, et al., Vision Transformers for Dense Prediction. webpage found at: https://openaccess.thecvf.com/content/ICCV2021/html/Ranftl_Vision_Transformers_for_Dense_Prediction_ICCV_2021_paper.html, 2021.

* cited by examiner

*Primary Examiner* — Duy M Dang
(74) *Attorney, Agent, or Firm* — Kilpatrick Townsend & Stockton LLP

(57) ABSTRACT

A computer-implemented method can be used to generate a composite image. Image data can be received, and a low-resolution composite image can be generated. A first machine-learning model can be applied to the low-resolution image and to a mask of the image data to generate a second image. A second machine-learning model can be applied to the image data to perform color mapping from an optimal patch to a masked foreground area of the image data. The color mapping can be used to generate a third image. A composite image can be generated using the second image and the third image.

20 Claims, 9 Drawing Sheets

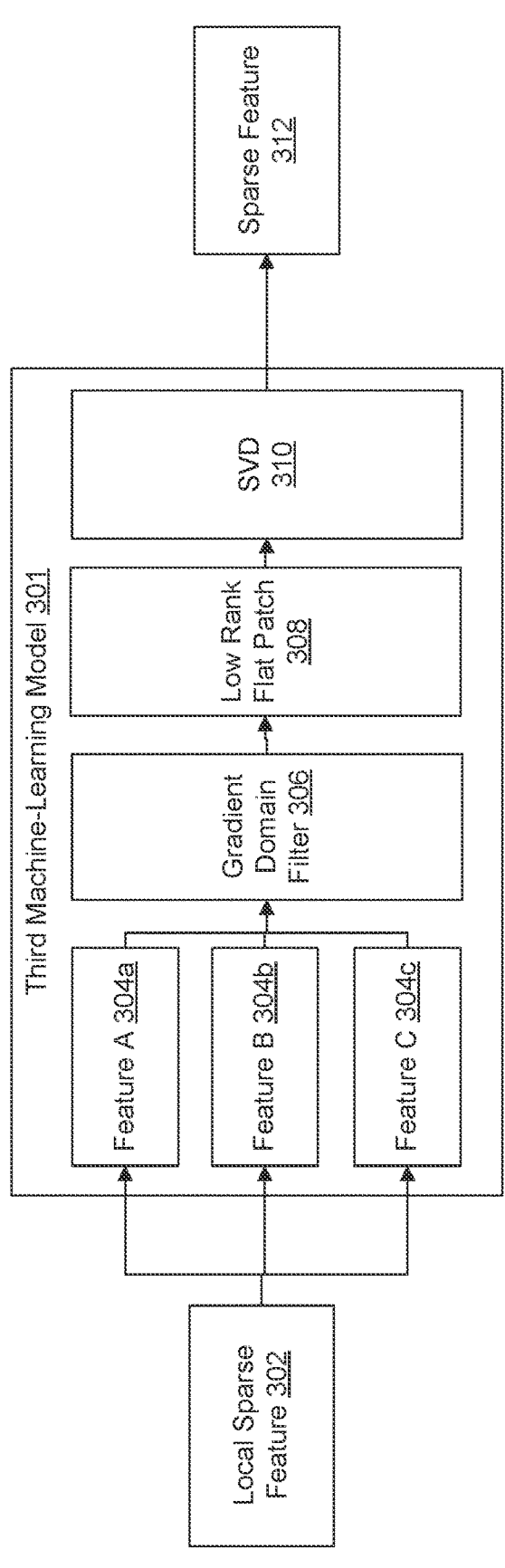
FIG. 3

500

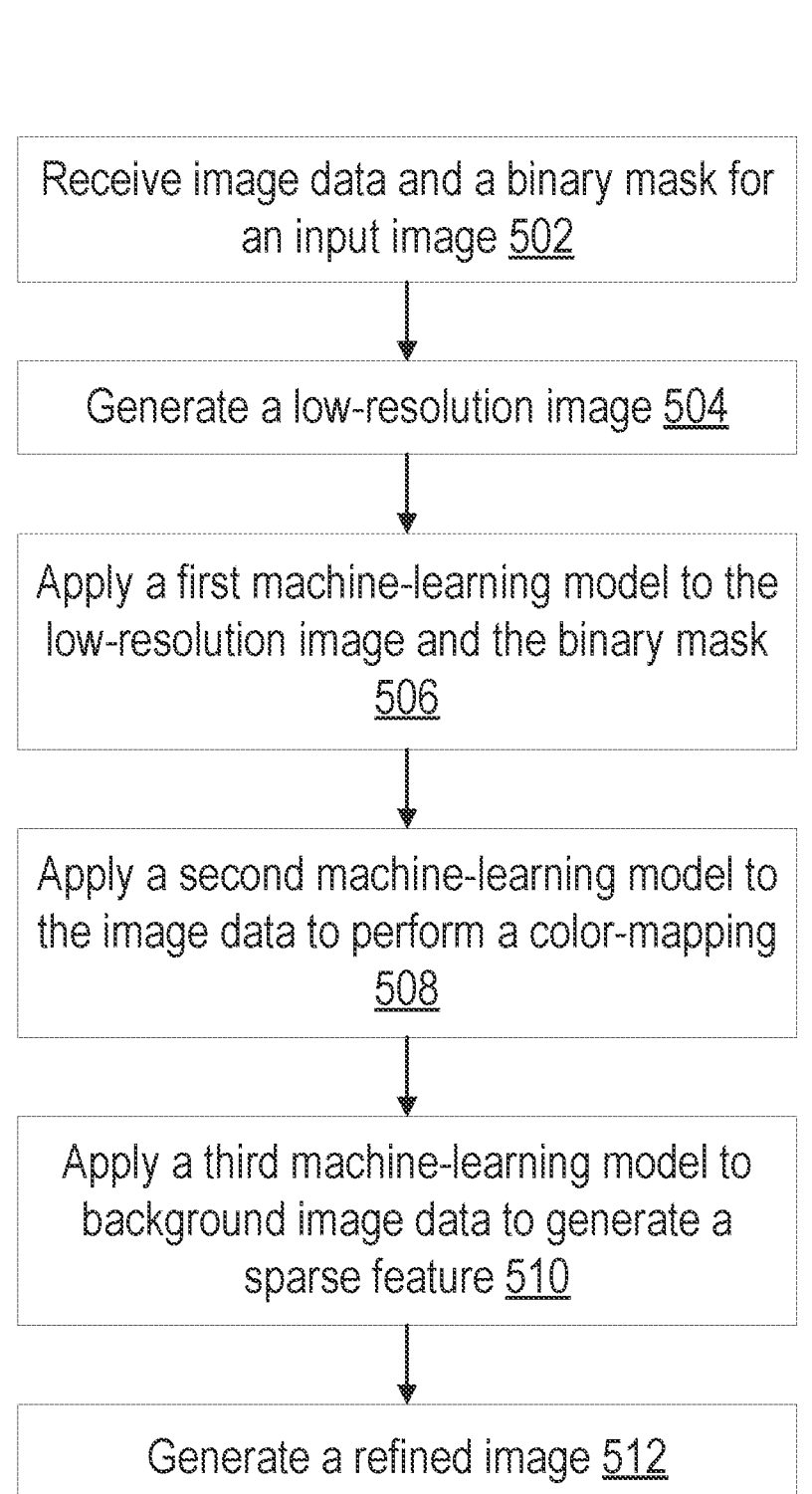

Receive image data and a binary mask for an input image 502

Generate a low-resolution image 504

Apply a first machine-learning model to the low-resolution image and the binary mask 506

Apply a second machine-learning model to the image data to perform a color-mapping 508

Apply a third machine-learning model to background image data to generate a sparse feature 510

Generate a refined image 512

FIG. 5

600

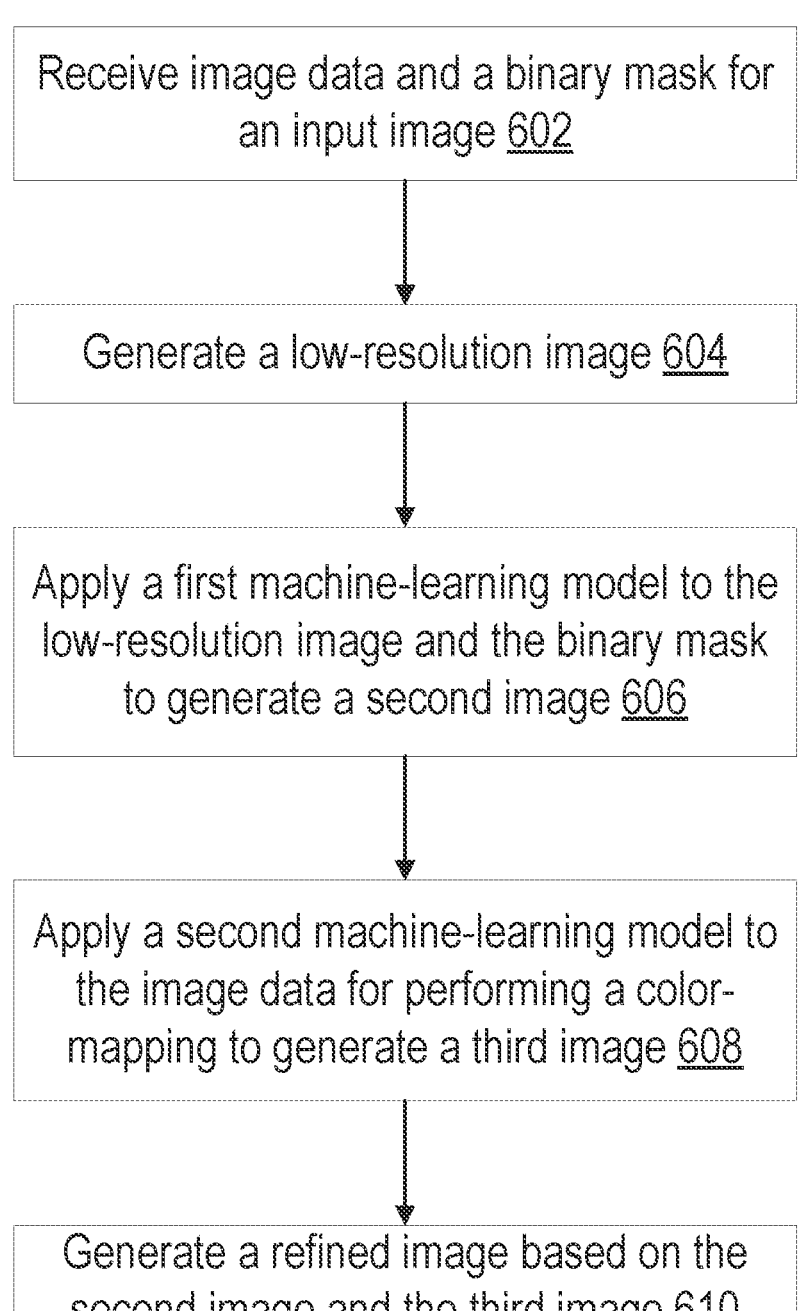

Receive image data and a binary mask for an input image 602

Generate a low-resolution image 604

Apply a first machine-learning model to the low-resolution image and the binary mask to generate a second image 606

Apply a second machine-learning model to the image data for performing a color-mapping to generate a third image 608

Generate a refined image based on the second image and the third image 610

FIG. 6

700

Receive image data and a binary mask for an input image 702

Generate a low-resolution image 704

Apply a first machine-learning model to the low-resolution image and the binary mask to generate a second image 706

Apply a second machine-learning model to background image data to generate a sparse feature 708

Generate a refined image based on the second image and the sparse feature 710

FIG. 7

MACHINE-LEARNING MODELS FOR GENERATING A REFINED IMAGE

BACKGROUND

Videos are generated and shared across multiple content-viewing platforms such as the Internet, movie theaters, traditional television, and the like. Prior to being shared, videos can be altered or otherwise edited to enhance visual quality of the video, to remove unwanted imagery, to insert virtual advertisement, and the like. Conventional techniques for video and image editing are labor-intensive and are subject to error and other challenges.

BRIEF DESCRIPTION OF THE DRAWINGS

Various embodiments in accordance with the present disclosure will be described with reference to the drawings, in which:

FIG. 3 illustrates a data flow diagram that illustrates a data flow with respect to a machine-learning model to generate a sparse feature according to some embodiments;

FIG. 5 illustrates a flowchart of a process to generate a refined image using a set of machine-learning models;

FIG. 6 illustrates another flowchart of a process to generate a refined image using a set of machine-learning models;

FIG. 7 illustrates another flowchart of a process to generate a refined image using a set of machine-learning models;

DETAILED DESCRIPTION

Figure 1:
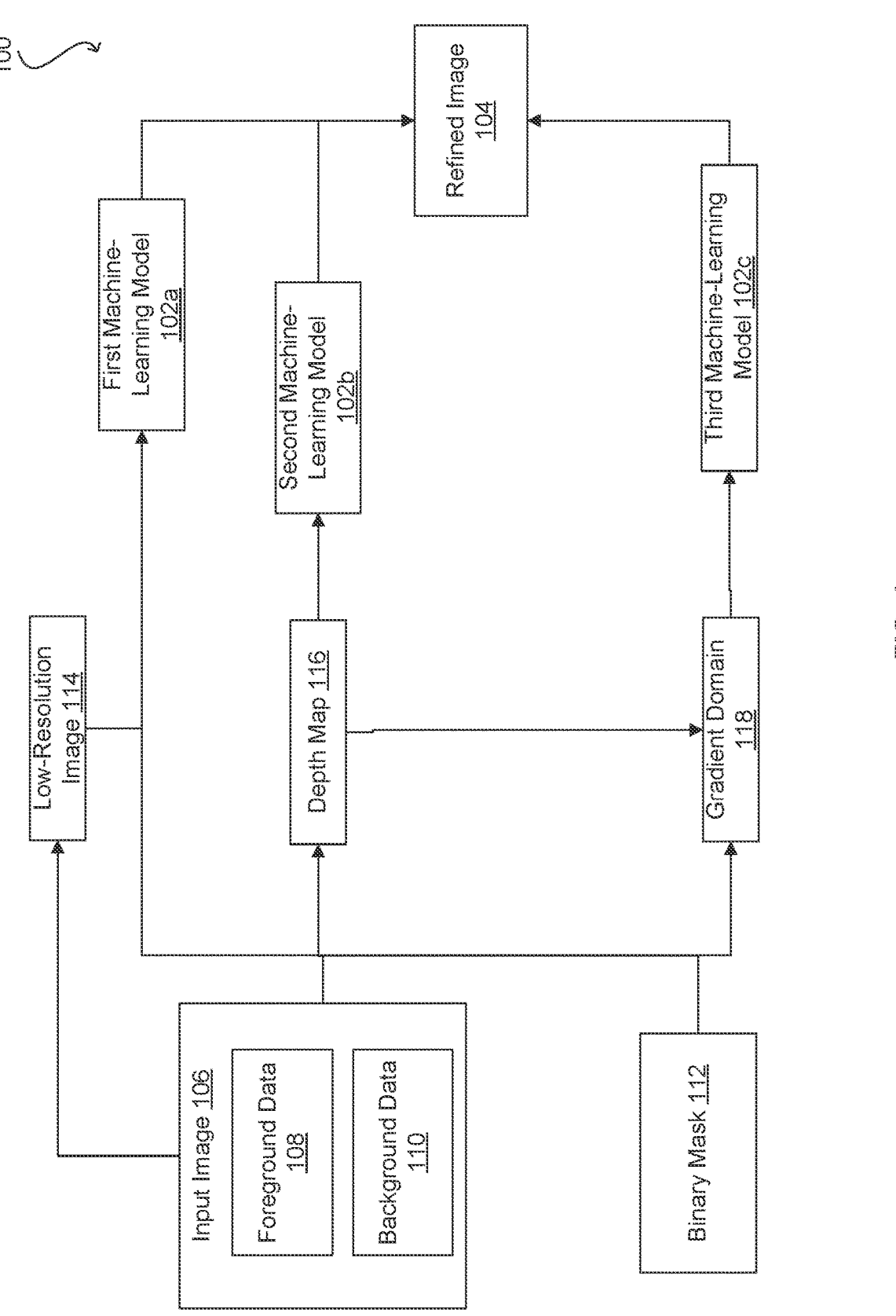
FIG. 1 illustrates a data flow diagram that illustrates a data flow among a set of machine-learning models to generate a refined image according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain aspects and features of the present disclosure relate to machine-learning techniques for generating a refined image. The machine-learning techniques may involve a set of machine-learning models, which may include one, two, three, four, or more machine-learning models, and the refined image may be generated by applying the set of machine-learning models to an input image. In some examples, data, such as foreground data, background data, and the like, from the input image can individually or each be input into one or more of the machine-learning models of the set of machine-learning models to generate the refined image. The refined image may include the same or similar features as the input image, but the features of the refined image may be adjusted with respect to the input image.

An input image data can be received by a computing device. The input image may originate from a video or other suitable source for the input image. A computing device, such as a computer server, a mobile computing device, and the like, can apply a first machine-learning model to the input image to generate a coarse harmonized image. The computing device can additionally apply a second machine-learning model to the input image to perform a color mapping to generate a fine harmonized image. Additionally, the computing device can apply a third machine-learning model to the input image to generate a sparse feature, which may include one or more features with mostly zero values, for use in transforming texture and the like for the input image. The coarse harmonized image, the fine harmonized image, the sparse feature, or any combination thereof can be used to generate the refined image.

Techniques described herein include generating a refined image from an input image using a set of machine-learning models. The input image can include image data having foreground image data, background image data, a binary mask that indicates the foreground image data, and other suitable image data. A computing device, such as a computer server, a mobile computing device, and the like, can generate a low-resolution image based on the image data. The computing device can apply a first machine-learning model of the set of machine-learning models to the low-resolution image and to the binary mask to generate a second image that includes second image data having global contextual data for the second image. The computing device can apply a second machine-learning model to the image data to perform a color mapping from an optimal patch that is near or inside the local background area to the masked foreground image data. In some examples, the local background area can be a bounding box, a bounding area (e.g., with irregular shape), or other area that can include foreground data of the input image.

In some examples, the color mapping can be performed by determining the local background area, generating reference patches, selecting the optimal patch, and applying the color mapping. The local background area can include a target local image patch for color mapping. The reference patches can be adjacent, inside or outside of the local background area, and each reference patch may extend from the local background area and in a different direction than a different reference patch of the reference patches. A depth-estimation model can be used to select the optimal patch that may correspond to the foreground image data. A patch from the background image data can be used as a reference to facilitate applying the color mapping from the optimal patch to the local background area. In some examples, applying the color mapping can generate a third image.

The computing device can apply a third machine-learning model to the background image data to generate a sparse feature (noise, blur) via various operations. For example, the third machine-learning model can receive, as input, the optimal reference patch. The third machine-learning model can transform the most optimal reference patch into gradient domain to generate sparse feature parameter including noise parameters and blur parameters. Additionally, the third machine-learning model will apply sparse feature to the refined foreground image. The computing device can generate the refined image using the second image, the third image, and the sparse feature. For example, the computing device can combine the second image, the third image, and the sparse feature to generate the refined image.

In some embodiments, the computing device can determine the local background area by applying blob detection to the binary mask. Then, the reference patches can include a first set of reference patches that are adjacent and internal with respect to the local background area, and the reference patches can include a second set of reference patches that are adjacent and external with respect to the local background area. Additionally, selecting the optimal patch can involve generating a depth map of the image data, extracting key point depth from the depth map generating a ranked patch list of the reference patches, and determining the optimal patch based on the key points and the ranked patch list. In some examples, each key point of the key points can correspond to the foreground image data, and the ranked patch list can order the reference patches by a depth distance from the key point's depth in depth map and a brightness of gray-scale coloring.

In some examples, the color mapping can involve combining two or more matrices. The two or more matrices may include a one pair of orthogonal matrices, a pair of diagonal matrices, or a combination thereof. Additionally, the image data received by the computing device may originate from a video that includes video data.

In some examples, generating a refined image can involve learning or otherwise determining an accurate mapping network for foreground image data and harmonizing the foreground data with the background data. For some video data, the effective local illumination color transfer for each sub-area can be used to generate the refined image. A multi-scale, depth-guided harmonization network, which may include a set of machine-learning models, for maximally extracting the 3D spatial data can be used to aid appearance inference of the foreground data. The background data can be analyzed in at least three different ways: coarse inference based on a global level, fine inference based on a geometrically local level, and gradient-domain inference on sparse level.

The foreground data can be denoted by $I_f$, and the background data can be denoted by $I_b$. The binary mask M can indicate the region of the foreground data, which can be the area to be harmonized in the composite or refined image, $I_c$. The image composition or refinement technique can be represented as $I_c = M*I_f + (1-M)*I_b$, where * is the Hadamard product. A mapping network (e.g., that includes the set of machine-learning models) can be determined to reconstruct $I_c$ to be as close as possible to ground truth photo-realistic image.

FIG. 1 illustrates a data flow diagram that illustrates a data flow 100 among a set of machine-learning models 102a-c to generate a refined image 104 according to some embodiments. As illustrated, the data flow 100 includes three machine-learning models: a first machine-learning model 102a, a second machine-learning model 102b, and a third machine-learning model 102c. Other suitable numbers (e.g., less than three or more than three) of machine-learning models can be included in the data flow 100 to generate the refined image 104. Each machine-learning model of the set of machine-learning models 102a-c may be similar or identical, or may alternatively be different from one another. For example, each machine-learning model may be or include a deep neural network, or other variant of machine-learning model, configured to generate different outputs, or each machine-learning model may be different (e.g., a deep neural network, a recurrent neural network, etc.) and may be configured to generate similar outputs, or any combination thereof.

In some examples, the data flow 100 can begin with input image 106. The input image 106 may be or include a single input image, may include a combination of images, and/or may include foreground data and background data that originate from different sources. In some examples, the input image can include foreground data from a first image superimposed on background data from a second image different than the first image. Additionally, the input image may be or include a file that includes foreground data, background data, and/or a binary mask. The file may be or include an OpenEXR (EXR) file, a PNG file, a JPEG file, and/or any other suitable type of file format for the input image.

The input image 106 can be input, for example manually, into a computing device that include the set of machine-learning models 102a-c. In other examples, the computing device may, for example automatically, extract the input image 106, or any image data thereof, from a separate data file such as a video file that includes video data. The input image 106 can include foreground data 108, background data 110, and any other suitable data associated with the input image 106. The foreground data 108 can include data from the input image 106 associated with, or otherwise indicating, a local background area of the input image 106. In some examples, the local background area of the input image 106 may include portions of the input image 106 that are in-focus or that are otherwise intended to be viewed by an entity. Additionally, the background data 110 can include data from the input image 106 associated with, or otherwise indicating, a background area of the input image 106. In some examples, the background area may be portions of the input image 106 not in the local background area of the input image 106.

The computing device can receive a binary mask 112 for the input image 106. For example, the computing device can determine, based on the image data of the input image 106, the binary mask 112. In other examples, the binary mask 112 may be input into the computing device or may otherwise be associated with the image data of the input image 106. The binary mask 112 may indicate the foreground data 108. For example, the binary mask 112 may include at least the foreground data 108, may include an outline around at least the local background area of the input image 106, or the like. The binary mask 112 may be determined based on a target object included in the input image 106. In one particular example, the binary mask 112 may include a computer screen, a consumer object, or other item that is illustrated in the input image 106, though other suitable examples of the binary mask 112 are possible The foreground data 108, the background data 110, and/or the binary mask 112 can be input (e.g., directly or indirectly) into the first machine-learning model 102a, the second machine-learning model 102b, and/or the third machine-learning model 102c. For example, the foreground data 108 and the background data 110 can be used to generate a low-resolution image 114 that can be input into the first machine-learning model 102a along with the binary mask 112. Additionally, the foreground data 108 and the background data 110 can be used with respect to the second machine-learning model 102b. For example, a depth map 116 can be generated for the input image using the foreground data 108 and the background data 110, and the input image 106 and the depth map 116 can be input into the second machine-learning model 102b. Additionally, the foreground data 108, the background data 110, the binary mask 112, and/or the depth map 116, or any data included therein, can be transformed into a gradient domain 118 that can be input into the third machine-learning model 102c.

The first machine-learning model 102a, the second machine-learning model 102b, and the third machine-learning model 102c may each generate a different output. For example, (i) the first machine-learning model 102a may generate a second image based on the low-resolution image 114 and the binary mask 112, (ii) the second machine-learning model 102b may generate a third image based on the depth map 116 and the input image 106, and (iii) the third machine-learning model 102c may generate a sparse feature based on the foreground data 108, the background data 110, the binary mask 112, and/or the depth map 116, or any data included therein, transformed into the gradient domain 118. The second image may be or include a coarse-harmonized image, and the third image may be or include a fine-harmonized image. In some examples, each of the second image, the third image, and the sparse feature can be combined to generate the refined image 104.

Figure 2:
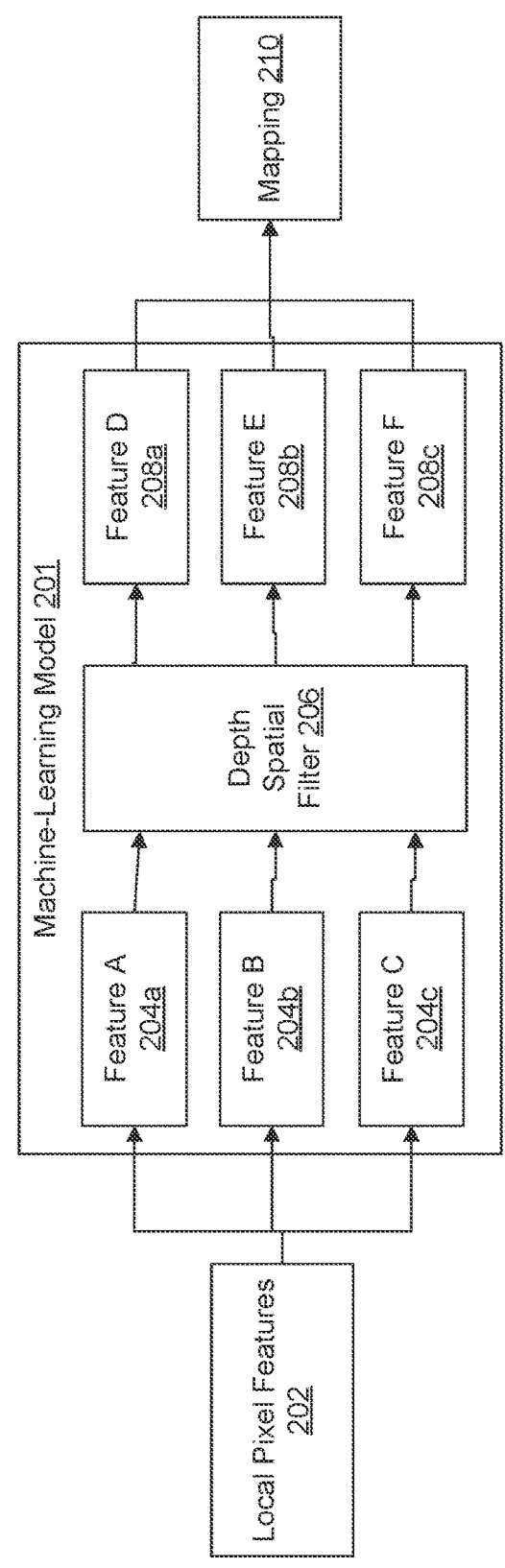
FIG. 2 illustrates a data flow diagram that illustrates a data flow with respect to a machine-learning model for performing a mapping operation according to some embodiments.

FIG. 2 illustrates a data flow diagram that illustrates a data flow 200 with respect to a machine-learning model 201 for performing a mapping operation according to some embodiments. In some examples, the machine-learning model 201 can be generated, applied, and the like by a computing device, and the machine-learning model 201 may be similar or identical to the second machine-learning model 102b illustrated and described with respect to FIG. 1. The machine-learning model 201 may receive, as input, local pixel features 202 from the input image 106. In some examples, the local pixel features 202 may be or include data from pixels in the foreground data 108, data from pixels in the background data 110, or the like. The machine-learning model 201 can parse the local pixel features 202 to generate a set of different features. For example, and as illustrated in FIG. 2, the local pixel features 202 can be parsed into feature A 204a, feature B 204b, and feature C 204c, though any other suitable number (e.g., less than three or more than three) features can be parsed from the local pixel features 202.

The machine-learning model 201 can generate or otherwise receive a depth map (e.g., similar to the depth map 116 described in FIG. 1) of the input image 106. The depth map can identify a depth and other suitable data with respect to each pixel associated with the local pixel features 202, or any subset thereof. The machine-learning model 201 can apply a depth spatial filter 206 to the parsed features, such as feature A 204a, feature B 204b, and feature C 204c to generate the depth map, to generate mapped features, such as feature D 208a, feature E 208b, and feature F 208c, and/or to generate any other data for a mapping operation. In some examples, the machine-learning model 201 can use the depth-filtered features, such as feature D 208a, feature E 208b, and feature F 208c, to perform a mapping 210. The mapping 210 may include a color mapping from one or more pixels of the background data 110 to the foreground data 108, or any other mapping that can be used to generate the refined image 104.

In some examples, the computing device can perform the mapping 210 for complex input images with locally varying illumination, and the machine-learning model 201 can enable effective transfer of local illumination color in the background to the foreground. In some examples, the global transformation used with respect to the first machine-learning model can be used in combination with the color mapping performed by a fine harmonization model (e.g., the machine-learning model 201). To enable expressive and generalized photo-realistic color mapping, the machine-learning model 201 can be used to extract local contextual data as the mapping 210. In examples in which the local background area includes or is a bounding box, the target local image for color mapping can be extracted by first using blob detection in the binary mask data to generate the local background area as bounding box $\hat{B}^l \in R^{h_p \times w_b}$ Then, multi-scale reference patches (e.g., feature A 204a, feature B 204b, and feature C 204c, etc.) based on both internal and external nearby area of the bounding box $\hat{B}^l$ can be generated in multiple (e.g., two, three, four, or more) directions to capture multiple levels of visual details. In some examples, each patch may include one or more pixels, or features thereof, of the image data.

The reference patches, or one or more pixels thereof, closest to the binary mask can be informative local statistics for foreground appearance. The patch selection process can be optimized by utilizing depth estimation (e.g., via the depth spatial filter 206) as localization prior by choosing one or more reference patches of the set of reference patches that are similar or identical to the foreground data with respect to depth. The depth values of each pixel in image $I_i$ can be obtained from a depth map $D_i$ that can be provided by the depth estimation model, which may be a pretrained monocular depth-estimation model, or other suitable depth estimation model. The depth of key point $p_i$ in source reference patch $S_{ij} \in \{0,1\}^{w_s \times h_s}$ can be extracted from $D_i$ using bilinear interpolation as $D_i[p_i]$. The depth of the center of the foreground data can be denoted as $D_r$. Additionally, $d_{min} \in R$ and $d_{max} \in R$ can indicate the minimum and maximum depth value of patches (e.g., pixels), respectively, in the foreground data. And, $\Delta = d_{max} - d_{min}$ can be the difference between the maximum and minimum depth values. In some examples, $S_{ij} = 1$ if the following condition is true:

$$D_r - \epsilon\Delta \leq S_{ij} \leq D_r + \epsilon\Delta \tag{1}$$

The filtered reference patches (e.g., feature D 208a, feature E 208b, feature F 208c, etc.) can be ranked based on the brightness of gray-scale for the mapping 210. The mapping 210 can be based on the principal axes of $\Sigma_v$ to that of $\Sigma_u$. The covariance matrices can be decomposed into one or more symmetric, positive matrices. For example, $$\sum\nolimits_u = O_u^T D_u O_u \text{ and}$$
$$\sum\nolimits_v = O_v^T D_v O_v$$

can be the spectral decomposition, where $O_u$ and $O_v$ are orthogonal matrices and $D_u$ and $D_v$ are diagonal matrices that include the (positive) eigenvalues of $\Sigma_u$ and $\Sigma_v$. The matrices $$\sum\nolimits_u^{1/2} = O_u^T D_u^{1/2} O_u \text{ and } \sum\nolimits_v^{1/2} = O_v^T D_v^{1/2} O_v$$

can be the positive square roots of $\Sigma_u$ and $\Sigma_v$. These decompositions can lead to the local color mapping:

$$T = \sum\nolimits_v^{1/2} \sum\nolimits_u^{-1/2} \tag{2}$$

Principal component analysis color transform can be selected to use the reference background patch as the source image and perform the mapping 210 from, for example, the optimal reference patch to the target image $\hat{B}^l$ as a foreground data edit (e.g., adjustment) followed, for example, by an alpha blend with the raw composite image.

FIG. 3 illustrates a data flow diagram that illustrates a data flow 300 with respect to a machine-learning model 301 to generate a sparse feature (e.g., based on a local sparse feature 302) according to some embodiments. In some examples, the machine-learning model 301 may be similar or identical to the third machine-learning model 102c illustrated and described with respect to FIG. 1. The machine-learning model 301 may receive, as input, a local sparse feature 302 and other suitable input such as reference patches, local pixel data, or the like. The machine-learning model 301 can parse the input the local sparse feature 302, the reference patches, and the like into a set of input features, which may include feature A 304a, feature B 304b, feature C 304c, and any other suitable input features.

The machine-learning model 301 can transform the input features, such as feature A 304a, feature B 304b, and/or feature C 304c, into a gradient domain using gradient domain filter 306 that can transform input features in the gradient domain. The feature A 304a, the feature B 304b, and/or the Feature C 304c may each, or in combination, originate from the input image, the binary mask, the depth map, and/or any other suitable origination. In some examples, the machine-learning model 301 can use a gradient covariant matrix to transform the input features into the gradient domain. Additionally, the machine-learning model 301 can select a particular patch of received reference patches using low rank flat patch 308, and the machine-learning model 301 can apply a single value decomposition (SVD) 310 to an output of the low rank flat patch 308 to generate a sparse feature 312 based on the local sparse feature 302. The machine-learning model 301 may include other features, services, and the like to generate the sparse feature 312 based on the local sparse feature 302 and other suitable inputs such as the reference patches.

For some input images, the background and associated background image data may be subject to various adjustments such as defocus blur, film grains, noise, and the like. The third machine-learning model 301, by itself or in combination with other machine-learning models, can automatically transfer and reproduce the adjustments across input images with a wide variety of backgrounds in high-quality. A basic physical relationship may exist between depth and defocus. A level of defocus blur and/or noise can be determined by the depth of field and other image parameters, for example substantially contemporaneously. The basic physical relationship can be applied, for example via the third machine-learning model 301, to estimate the detailed, texture-wise style information to mimic the texture details generated via manual adjustment of the input image.

The texture-wise sparse style transform can be used concurrently or separately from the fine-harmonization network (e.g., the machine-learning model 201) since sparse texture consistency may be a separate factor than color harmonization, though sparse style transform and color harmonization may share a similar 3D underlying image data for local reference candidate selection. Upon receiving the multi-scale nearby reference patches (e.g., the set of reference patches) from depth map, the reference patches can be transformed into the gradient domain by a gradient covariance matrix (e.g., via the gradient domain filter 306).

For the sparse style transform, a local reference patch can be $y_i$, and in the gradient domain, the $N^2 \times 2$ gradient matrix can be expressed as $$G_{y_i} = [P_h y_i, P_v y_i] \tag{3}$$

where $P_h$ and $P_v$ represent matrices of horizontal and vertical derivative operators, respectively. The $N^2 \times N^2$ matrices $P_h$ and $P_h$ can be or include Toeplitz matrices that can be derived from the gradient domain filter 306. The gradient covariance matrix $C_{y_i}$ for the local reference image patch $y_i$ can be defined as $$C_{y_i} = G_{y_i}^T G_{y_i} = \begin{bmatrix} y_i^T P_h^T P_h y_i, & y_i^T P_h^T P_v y_i \\ y_i^T P_v^T P_h y_i, & y_i^T P_v^T P_v y_i \end{bmatrix} \tag{4}$$

The sparse feature information can be extracted from the patch $y_i$ by the gradient matrix $G_{y_i}$ and the gradient covariance matrix $C_{y_i}$. In gradient domain, a dominant direction and an energy of a local patch can be measured using the eigenvectors and eigenvalues of $C_{y_i}$. The texture strength of the local patch can be represented by the trace of the covariance matrix $C_{y_i}$. Low-rank patches (e.g., determined via the low rank flat patch 308) with a smaller trace can be identified as a patch with weak texture strength by thresholding the texture strength. Additionally, the low rank patches can include more sparse features than other patches in the image data like white noise and blur, etc.

A principal component analysis-based noise estimation algorithm (e.g., executed via SVD 310) can be executed to iteratively estimate the smallest noise standard deviation among the low-rank patches. The optimal noise level parameter n can be calculated by searching via a denoising algorithm such as BM3D or other suitable denoising algorithms. A least-squares approach can be used to estimate quadratic regression models. Additionally, candidate patches can be checked to see if the candidate patches have the minimum depth distance among the image. If not, the noise in the local image patch can be applied. Accordingly, the sparse information of the background image can be further extracted from the frequency domain.

Figure 4:
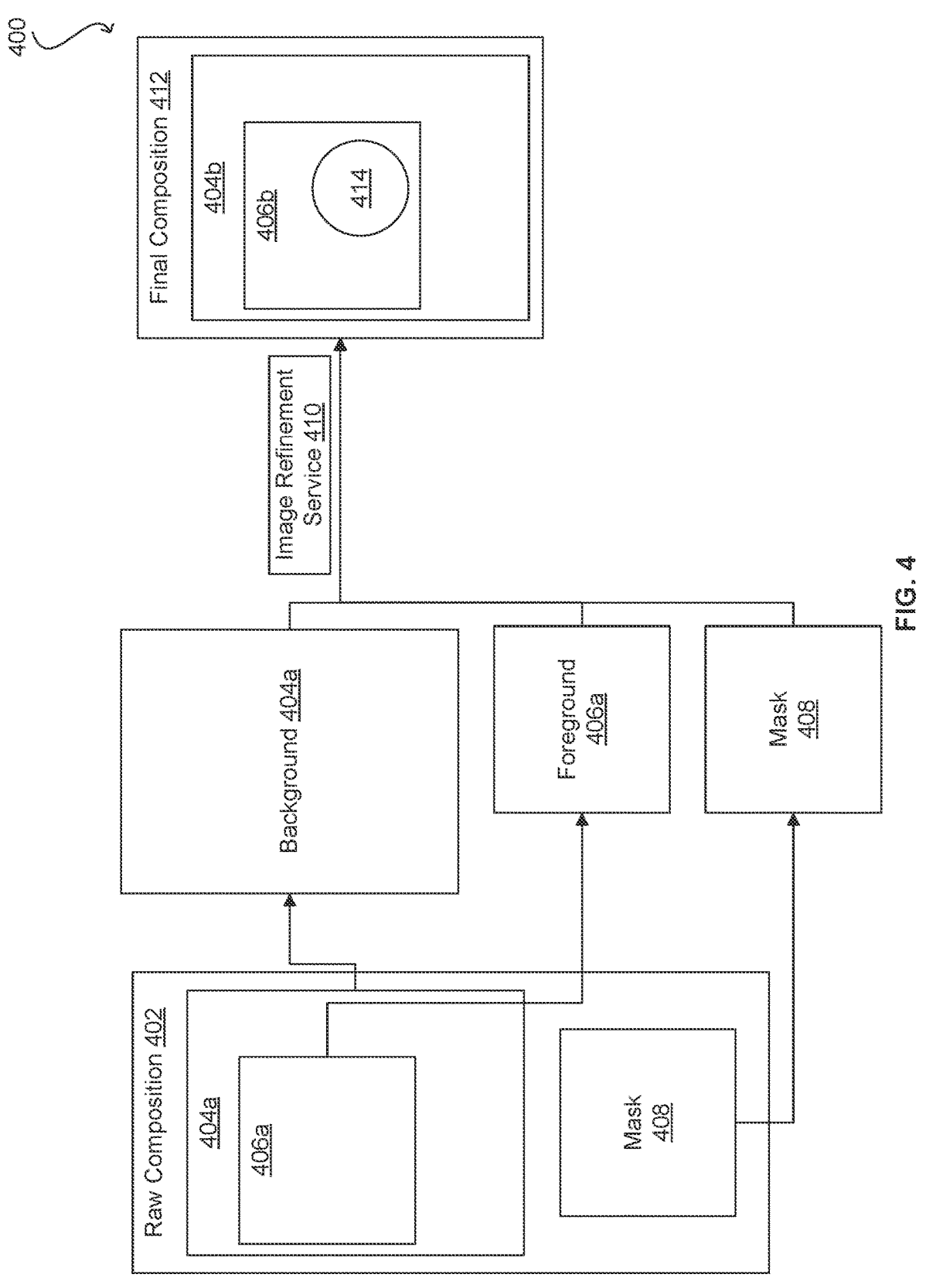
FIG. 4 illustrates a data flow diagram that illustrates a data flow of image data to generate a refined image according to some embodiments.

FIG. 4 illustrates a data flow diagram that illustrates a data flow 400 of image data to generate a refined image according to some embodiments. The data flow 400 may begin or initiate by receiving a raw composition 402. In some examples, the raw composition 402 may be or include an input image that includes a foreground 404a, a background 406a, a mask 408, and any other suitable features for the raw composition 402. The raw composition 402 may be manually input, for example by a user into a computing device, or may be automatically extracted, for example by the computing device extracting the input image from a separate data file such as a video data file. Additionally, the raw composition 402 may include a target object or target area to be harmonized. Harmonizing the target object or the target area may involve adjusting color, brightness, blur, noise, and other parameters of the target object, of the target area, or of pixels of the target object or in the target area to cause an updated target object or an updated target area to blend with the remaining portions of the image.

One or more machine-learning models, such as the first machine-learning model 102a, the second machine-learning model 102b, and/or the third machine-learning model 102c, or one or more other suitable services of a computing device, can receive the raw composition 402 and can extract or otherwise determine the foreground 404a of the raw composition 402, the background 406a of the raw composition 402, and the mask 408 of the raw composition 402. The mask 408 can indicate the foreground 404a of the raw composition 402 or may otherwise indicate an area or object of the raw composition 402 to be adjusted and/or harmonized. For example, the mask 408 can be or include the pixels of the foreground 404a of the raw composition 402. In other examples, the mask 408 may be an alpha channel of an OpenEXR (EXR) formatted file. The one or more machine-learning models can parse image data of the raw composition 402 to determine the foreground 404a, the background 406a, and/or the mask 408 of the raw composition 402. In other examples, the one or more machine-learning models can receive the image data that includes the foreground 404a, the background 406a, and/or the mask 408 of the raw composition 402.

The one or more machine-learning models can use the foreground 404a, the background 406a, and/or the mask 408 of the raw composition 402 to generate a final composition 412. For example, the one or more machine-learning models can execute an image refinement service 410 to generate the final composition 412. In some examples, the image refinement service 410 can involve applying the one or more machine-learning models to the foreground 404a, the background 406a, and/or the mask 408 of the raw composition 402 to generate the final composition 412 that includes foreground 404b, background 406b, and adjusted feature 414. In a particular example, the image refinement service 410 can involve applying a first machine-learning model (e.g., the first machine-learning model 102a) to a low-resolution image determined from the foreground 404a and from the background 406a and to the mask 408 to generate a coarse-harmonized image. Additionally, the image refinement service 410 can involve applying a second machine-learning model (e.g., the second machine-learning model 102b) to the foreground 404a and to the background 406a to generate a fine-harmonized image. And, the image refinement service 410 can involve applying a third machine-learning model (e.g., the third machine-learning model 102c) to the background 406a to generate a sparse feature.

The image refinement service 410 can adjust the raw composition 402 by applying the coarse-harmonized image, the fine-harmonized image, and the sparse feature to the raw composition 402. Applying the coarse-harmonized image, the fine-harmonized image, and the sparse feature to the raw composition 402 may cause the target object, the target area, and/or the pixels included in the mask 408 to be adjusted to generate the final composition 412 that includes the foreground 404b, the background 406b, and the adjusted feature 414. In some examples, the image refinement service 410 may adjust the foreground 404a to generate the foreground 404b, may adjust the background 406a to generate the background 406b, may adjust the mask 408 to generate the adjusted feature 414, or any combination thereof. In a particular example, the image refinement service 410 may adjust the mask 408 to generate the adjusted feature 414, while the foreground 404b and the background 406b may be similar or identical to the foreground 404a and the background 406a, respectively.

In some examples, upon generating the coarse-harmonized image, the fine-harmonized image, and the sparse feature, the coarse-harmonized image and the fine-harmonized image can be fused together in a refinement service, for example upon concatenating the global transform layer $I_g$, the local transform layer $I_l$, the mask layer $I_m$, and the feature mapping layer $F_{enc}=E(\tilde{I}^g, M^g)$ from the last global layer. In the refinement service, two convolutional layers can be used. Each convolutional layer can be followed by a batch normalization and an exponential linear unit activation. Additionally, and for example at an end of the refinement module, the low-resolution image $I_r$ (now adjusted) can be enlarged by a blending layer that can transfer the edited RGB information of local background area from the edited image to the original image by color transform algorithm to be the same or similar size as the original image $I_c$.

FIG. 5 illustrates a flowchart of a process 500 to generate a refined image using a set of machine-learning models. Some or all of the process 500, or any other processes described herein, or variations, and/or combinations thereof, may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium is non-transitory. In some examples, the process 500, or any operation thereof, can utilize the first machine-learning model 102a, the second machine-learning model 102b, the third machine-learning model 102c, or any other suitable model.

At block 502, the process involves receiving image data and a binary mask for an input image. In some examples, a computing device can receive the image data and the binary mask, the computing device can extract the image data and/or the binary mask from the input image, and the like. Additionally, the input image, or any data thereof, may be extracted from video data of a video that includes the input image.

The image data can include foreground data, background data, and other suitable data that can be used to indicate one or more portions of the input image. The foreground data can include pixels or other data in a foreground portion of the input image. The foreground portion may include one or more areas, one or more objects, or the like that are in-focus in the input image, that are intended to be viewed by a user of the input image, etc. The background data can include pixels or other data in a background portion of the input image. The background portion may include one or more areas, one or more objects, or the like that are not included in the foreground portion of the input image. Additionally, the binary mask may indicate the foreground portion of the input image. For example, the binary mask may include the one or more areas, the one or more objects, or the like included in the foreground portion of the input image. Additionally, or alternatively, the binary mask may include boundaries (e.g., a local background area) that may approximately surround the foreground portion or the foreground portions of the input image.

At block 504, the process involves generating a low-resolution image based on the image data. The computing device, or any model or service thereof, can resize the input image to generate the low-resolution image. In some examples, the input image, and/or the image data thereof, can be resized $I_c \in \mathbb{R}^{h \times w \times 3}$ to be the low-resolution image $(\tilde{I}_g, M_g)$, which can be input into a model or service to be processed.

At block 506, the process involves applying a first machine-learning model (e.g., the first machine-learning model 102a) to the low-resolution image and to the binary mask. In some examples, the first machine-learning model may be or include a coarse harmonization network that can generate a coarse-harmonized image based on the low-resolution image and the binary mask. The coarse harmonization network can generate a second image (e.g., the coarse-harmonized image) that includes second image data having global contextual data for the second image.

To adjust the foreground data (e.g., pixels) of the input image according to the background data (e.g., pixels), coarse contextual data on global level can be determined, for example by using the low-resolution image and the binary mask. In a particular example, one or more deep-learning networks can extract global contextual information and can facilitate global harmonious editing for the foreground data. The coarse harmonization network can input the input image with the binary mask and can produce the coarse-harmonized image. In some examples, the first machine-learning model (e.g., the coarse-harmonized network) can be or include a UNet alike generator with an encoder-decoder structure and with a skip connection between. Additionally, the style of the foreground image can be optimized to achieve a photo-realistic effect, iS$^2$AM can be used as a generator since iS$^2$AM can enable a blending layer to be better fitted for foreground data adjustment and response for the global-level coarse harmonization. The generator can be used to generate one or more outputs close to a down-sampled ground truth image. After providing the input into the generator, the harmonized output can be close to the down-sampled ground truth real image (e.g., $I^{lr} \in R^{hxwx3}$ by minimizing the reconstruction loss $$L_g = \left\| \hat{I}_g^{lr} - I^{lr} \right\|_1 .$$

The harmonized results can be received and can include the global contextual statistics in low resolution.

At block 508, the process involves applying a second machine-learning model (e.g., the second machine-learning model 102*b*) to the image data to perform a color mapping. In some examples, the color mapping can be performed to map color from a most optimal patch of a set of reference patches to a masked foreground area, which shows the area/shape of inserted object, of the image data. The local background area, which means the background area closed to but outside of the masked foreground area, can be or include a bounding box, a bounding area, or the like and can be determined or received by the computing device. The local background area can include a target local image for color mapping. In a particular example, the computing device can determine the local background area by applying blob detection to the binary mask to generate the bounding box type of local background area. Then, the computing device can generate or receive the set of reference patches adjacent to the local background area. Each reference patch in the set of reference patches may extend in a different direction than a different reference patch of the set of reference patches. In a particular example, a first subset of the set of reference patches can be generated adjacent and internal with respect to the local background area, and a second subset of the set of reference patches can be generated adjacent and external with respect to the local background area.

The computing device can use a depth-estimation model to select the optimal patch among the set of reference patches. For example, the computing device can apply the depth-estimation model to the set of reference patches to select the optimal patch that has closest depth to the foreground image depth. Additionally, the computing device can apply the color mapping from the optimal patch to the masked foreground area, which the shape is defined by the binary mask, to generate a third image, which may be or include a fine-harmonized image. In some examples, the computing device can use a patch from the background image data as a reference from which to perform the color mapping.

The computing device can perform the color mapping for complex input images with locally varying illumination, and the second machine-learning model can enable effective transfer of local illumination color in the background to the foreground. In some examples, the global transformation used with respect to the first machine-learning model can be used in combination with the color mapping performed by a fine harmonization model (e.g., the second machine-learning model). To enable expressive and generalized photo-realistic color mapping, the fine harmonization model can be used to extract local contextual data as local color mapping. In examples in which the local background area is a bounding box, the optimal local image patch for color mapping can be extracted by first generating the local background area using blob detection in the binary mask data as bounding box $\hat{B}^l \in R^{h_b X w_b}$. Then, multi-scale reference patches (e.g., the set of reference patches) based on both internal and external nearby area of the bounding box B can be generated in multiple (e.g., two, three, four, or more) directions to capture multiple levels of visual details. The multi-scale may include: 1/2 of bounding box or local background area size, 1/4 of bounding box or local background area size, 1/8 of bounding box or local background area size, etc. In some examples, each patch of the set of reference patches may include one or more pixels, or features thereof, of the image data.

The reference patches (e.g., the one or more pixels) closest to the binary mask can be informative local statistics for foreground appearance. The patch selection process can be optimized by utilizing depth estimation as localization prior by choosing one or more reference patches of the set of reference patches that are similar or identical to the foreground data with respect to depth. The depth values of each pixel in image $I_i$ can be obtained from a depth map $D_i$ that can be provided by the depth estimation model, which may be a pretrained monocular depth-estimation model, or other suitable depth estimation model. The depth of key point $p_k$ in source reference patch $S_{ij} \in \{0,1\}^{w_s x h_s}$ can be extracted from $D_i$ using bilinear interpolation as $D_i[p_i]$. The depth of the center of the masked foreground area can be denoted as $D_r$. Additionally, $d_{min} \in R$ and $d_{max} \in R$ can indicate the minimum and maximum depth value of patches (e.g., pixels), respectively, in the foreground data. And, $\Delta = d_{max} - d_{min}$ can be the difference between the maximum and minimum depth values. In some examples, $S_{ij}$ may exist if the following condition is true:

$$D_r - \epsilon \Delta \leq S_{ij} \leq D_r + \epsilon \Delta \qquad (1)$$

The filtered reference patches can be ranked based on the brightness of gray-scale for local color mapping. The color mapping can be based on the principal axes of $\Sigma_v$ to that of $\Sigma_u$, which may be the covariance of RGB color triplets over the source and target areas. The covariance matrices can be decomposed into one or more symmetric, positive matrices. For example, $$\sum\nolimits_u = O_u^T D_u O_u \text{ and } \sum\nolimits_v = O_v^T D_v O_v$$

can be the spectral decomposition, where $O_u$ and $O_v$ are orthogonal matrices and $D_u$ and $D_v$ are diagonal matrices that include the (positive) eigenvalues of $\Sigma_u$ and $\Sigma_v$. The matrices $$\sum\nolimits_u^{1/2} = O_u^T D_u^{1/2} O_u \text{ and } \sum\nolimits_v^{1/2} = O_v^T D_v^{1/2} O_v$$

can be the positive square roots of $\Sigma_u$ and $\Sigma_v$. These decompositions can lead to the local color mapping:

$$T = \sum\nolimits_v^{1/2} \sum\nolimits_u^{-1/2} \tag{2}$$

Principal component analysis color transform can be selected to use the reference background patch as the source image and perform the color mapping from the optimal reference patch to the target image $\hat{B}^I$ as a foreground data edit (e.g., adjustment) followed, for example, by an alpha blend with the raw composite image.

At block 510, the process involves applying a third machine-learning model (e.g., the third machine-learning model 102c) to background data of the image data to generate a sparse feature. The third machine-learning model can receive or otherwise be applied to the set of reference patches. The reference patches received by the third machine-learning model may be associated with the background data. For example, the received reference patches may include pixels from the background data of the input image. Additionally, the third machine-learning model can transform each received patch of the set of reference patches into a gradient domain to generate a set of transformed reference patches, which may exist in the gradient domain. The third machine-learning model can extract the sparse feature from the set of transformed reference patches. In some examples, the extracted sparse feature may be or include a global sparse feature for the image data or any subset thereof such as the background image data.

For some input images, the background and associated local background image data may be subject to various adjustments such as defocus blur, film grains, noise, and the like. The third machine-learning model, by itself or in combination with other machine-learning models, can automatically transfer and reproduce the adjustments across input images with a wide variety of backgrounds in high-quality. A basic physical relationship may exist between depth and defocus. A level of defocus blur and/or noise can be determined by the depth of field and other image parameters, for example substantially contemporaneously. The basic physical relationship can be applied, for example via the third machine-learning model, to estimate the detailed, texture-wise style information to mimic the texture details generated via manual adjustment of the input image.

The texture-wise sparse style transform can be used concurrently or separately from the fine-harmonization network since sparse texture consistency may be a separate factor than color harmonization, though sparse style transform and color harmonization may share a similar 3D underlying image data for local reference candidate selection. Upon receiving the multi-scale nearby reference patches (e.g., the set of reference patches) from depth map, the reference patches can be transformed into the gradient domain by a gradient covariance matrix. For the sparse style transform, a local reference patch can be $y_k$, and in the gradient domain, the $N^2 \times 2$ gradient matrix can be expressed as $$G_{y_i} = [P_h y_i, P_v y_i] \tag{3}$$

where $P_h$ and $P_v$ represent matrices of horizontal and vertical derivative operators, respectively. The $N^2 \times N^2$ matrices $P_h$ and $P_h$ can be or include Toeplitz matrices that can be derived from a gradient filter. The gradient covariance matrix $C_{y_i}$ for the local reference image patch $y_i$ can be defined as $$C_{y_i} = G_{y_i}^T G_{y_i} = \begin{bmatrix} y_i^T P_h^T P_h y_i, y_i^T P_h^T P_v y_i \\ y_i^T P_v^T P_h y_i, y_i^T P_v^T P_v y_i \end{bmatrix} \tag{4}$$

The sparse feature information can be extracted from the patch $y_i$ by the gradient matrix $G_{y_i}$ and the gradient covariance matrix $C_{y_i}$. In gradient domain, a dominant direction and an energy of a local patch can be measured using the eigenvectors and eigenvalues of $C_{y_i}$. The texture strength of the local patch can be represented by the trace of the covariance matrix $C_{y_i}$. Low-rank patches with a smaller trace can be identified as a patch with weak texture strength by thresholding the texture strength. Additionally, the low rank patches can include more sparse features than other patches in the image data like white noise and blur, etc.

A principal component analysis-based noise estimation algorithm can be executed to iteratively estimate the smallest noise standard deviation among the low-rank patches. The optimal noise level parameter n can be calculated by searching via a denoising algorithm such as BM3D or other suitable denoising algorithms. A least-squares approach can be used to estimate quadratic regression models. Additionally, candidate patches can be checked to see if the candidate patches have the minimum depth distance among the image. If not, the noise in the local image patch can be applied. Accordingly, the sparse information of the background image can be further extracted from the frequency domain. From the gradient domain, the purest patch's frequency can be used to estimate the noise kernel, and the most complex reference patch can be used to estimate the blur kernel. Both kernels can be applied to the foreground image as the sparse feature transform from the background.

At block 512, the process involves generating a refined image (e.g., the refined image 104). In some examples, the computing device can generate the refined image using the second image (e.g., the coarse-harmonized image), the third image (e.g., the fine-harmonized image), and the sparse feature, or using any combination thereof. The refined image can be generated by combining the second image, the third image, and the sparse feature, or by otherwise using the second image, the third image, and the sparse feature.

Upon generating the coarse-harmonized image, the fine-harmonized image, and the sparse feature, the coarse-harmonized image and the fine-harmonized image can be fused together in a refinement service, for example upon concatenating the global transform layer $I_g$, the local transform layer $I_l$, the mask layer $I_m$, and the feature mapping layer $F_{enc} = E(\hat{I}^g, M^g)$ from the last global layer. In the refinement service, two convolutional layers can be used. Each convolutional layer can be followed by a batch normalization and an exponential linear unit activation. Additionally, the low-resolution image $I_r$ (now adjusted) can be enlarged by a blending layer to be the same or similar size as the original image $I_c$.

FIG. 6 illustrates another flowchart of a process 600 to generate a refined image using a set of machine-learning models. Some or all of the process 600, or any other processes described herein, or variations, and/or combinations thereof, may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium is non-transitory. In some examples, the process 600, or any operation thereof, can utilize the first machine-learning model 102*a*, the second machine-learning model 102*b*, the third machine-learning model 102*c*, or any other suitable device or model.

At block 602, the process involves receiving image data and a binary mask for an input image. In some examples, a computing device can receive the image data and the binary mask, the computing device can extract the image data and/or the binary mask from the input image, and the like. Additionally, the input image, or any data thereof, may be extracted from video data of a video that includes the input image.

The image data can include foreground data, background data, and other suitable data that can be used to indicate one or more portions of the input image. The foreground data can include pixels or other data in a foreground portion of the input image. The foreground portion may include one or more areas, one or more objects, or the like that are in-focus in the input image, that are intended to be viewed by a user of the input image, etc. The background data can include pixels or other data in a background portion of the input image. The background portion may include one or more areas, one or more objects, or the like that are not included in the foreground portion of the input image. Additionally, the binary mask may indicate the foreground portion of the input image. For example, the binary mask may include the one or more areas, the one or more objects, or the like included in the foreground portion of the input image. Additionally or alternatively, the binary mask may include boundaries (e.g., a local background area) that may approximately surround the foreground portion or the foreground portions of the input image.

At block 604, the process involves generating a low-resolution image based on the image data. The computing device, or any model or service thereof, can resize the input image to generate the low-resolution image. In some examples, the input image, and/or the image data thereof, can be resized $I_c \in R^{h \times w \times 3}$ to be the low-resolution image $(\tilde{I}_g, M_g)$, which can be input into a model or service to be processed.

At block 606, the process involves applying a first machine-learning model (e.g., the first machine-learning model 102*a*) to the low-resolution image and to the binary mask. In some examples, the first machine-learning model may be or include a coarse harmonization network that can generate a coarse-harmonized image based on the low-resolution image and the binary mask. The coarse harmonization network can generate a second image (e.g., the coarse-harmonized image) that includes second image data having global contextual data for the second image.

To adjust the foreground data (e.g., pixels) of the input image according to the background data (e.g., pixels), coarse contextual data on global level can be determined, for example by using the low-resolution image and the binary mask. In a particular example, one or more deep-learning networks can extract global contextual information and can facilitate global harmonious editing for the foreground data. The coarse harmonization network can input the input image with the binary mask and can produce the coarse-harmonized image. In some examples, the first machine-learning model (e.g., the coarse-harmonized network) can be or include a U-Net alike generator with an encoder-decoder structure and with a skip connection between. Additionally, the style of the foreground image can be optimized to achieve a photo-realistic effect, $iS^2AM$ can be used as a generator since $iS^2AM$ can enable a blending layer to be better fitted for foreground data adjustment and response for the global-level coarse harmonization. The generator can be used to generate one or more outputs close to a down-sampled ground truth image. After providing the input into the generator, the harmonized output can be close to the down-sampled ground truth real image (e.g., $I^{lr} \in R^{h \times w \times 3}$ by minimizing the reconstruction loss $$L_g = \left\| \hat{I}_g^{lr} - I^{lr} \right\|_1 .$$

The harmonized results can be received and can include the global contextual statistics in low resolution.

At block 608, the process involves applying a second machine-learning model (e.g., the second machine-learning model 102*b*) to the image data to perform a color mapping. In some examples, the color mapping can be performed to map color from an optimal patch among a set of reference patches to the masked foreground area of the image data. The local background area can be or include a bounding box, a bounding area, or the like and can be determined or received by the computing device. The local background area can include a target local image for color mapping. In a particular example, the computing device can determine the local background area by applying blob detection to the binary mask to generate the local background area. Additionally, the computing device can generate or receive the set of reference patches adjacent to the local background area. Each reference patch in the set of reference patches may extend in a different direction than a different reference patch of the set of reference patches. In a particular example, a first subset of the set of reference patches can be generated adjacent and internal with respect to the local background area, and a second subset of the set of reference patches can be generated adjacent and external with respect to the local background area.

The computing device can use a depth-estimation model to select the optimal patch among the set of reference patches. For example, the computing device can apply the depth-estimation model to the set of reference patches to select the optimal patch that corresponds to the foreground image data, which can be determined by the depth filter and a brightness filter. Additionally, the computing device can apply the color mapping from the optimal patch to the local background area to generate a third image, which may be or include a fine-harmonized image. In some examples, the computing device can use a patch from the background image data as a reference from which to perform the color mapping.

The computing device can perform the color mapping for complex input images with locally varying illumination, and the second machine-learning model can enable effective transfer of local illumination color in the background to the foreground. In some examples, the global transformation used with respect to the first machine-learning model can be used in combination with the color mapping performed by a fine harmonization model (e.g., the second machine-learning model). To enable expressive and generalized photo-realistic color mapping, the fine harmonization model can be used to extract local contextual data as local color mapping. In examples in which the local background area is a bounding box, the target local image for color mapping can be extracted by first using blob detection in binary mask to generate local background area as bounding box $\hat{B}^l \in R^{h_b X w_b}$. Then, multi-scale reference patches (e.g., the set of reference patches) based on both internal and external nearby area of the bounding box B' can be generated in multiple (e.g., two, three, four, or more) directions to capture multiple levels of visual details. In some examples, each patch of the set of reference patches may include one or more pixels, or features thereof, of the image data.

The reference patches (e.g., the one or more pixels) closest to the binary mask can be informative local statistics for foreground appearance. The patch selection process can be optimized by utilizing depth estimation as localization prior by choosing one or more reference patches of the set of reference patches that are similar or identical to the foreground data with respect to depth. The depth values of each pixel in image $I_i$ can be obtained from a depth map $D_i$ that can be provided by the depth estimation model, which may be a pretrained monocular depth-estimation model, or other suitable depth estimation model. The depth of key point $p_i$ in source reference patch $S_{ij} \in \{0,1\}^{w_s x h_s}$ can be extracted from $D_i$ using bilinear interpolation as $D_i[p_i]$. The depth of the center of the foreground data can be denoted as $D_r$. Additionally, $d_{min} \in R$ and $d_{max} \in R$ can indicate the minimum and maximum depth value of patches (e.g., pixels), respectively, in the foreground data. And, $\Delta = d_{max} - d_{min}$ can be the difference between the maximum and minimum depth values. In some examples, $S_{ij}=1$ if the following condition is true:

$$D_r - \epsilon\Delta \leq S_{ij} \leq D_r + \epsilon\Delta \tag{1}$$

The filtered reference patches can be ranked based on the brightness of gray-scale for local color mapping. The color mapping can be based on the principal axes of Ey to that of Eu. The covariance matrices can be decomposed into one or more symmetric, positive matrices. For example, $$\sum\nolimits_u = O_u^T D_u O_u \text{ and } \sum\nolimits_v = O_v^T D_v O_v$$

can be the spectral decomposition, where $O_u$ and $O_v$ are orthogonal matrices and $D_u$ and $D_v$ are diagonal matrices that include the (positive) eigenvalues of $\Sigma_u$ and $\Sigma_v$. The matrices $$\sum\nolimits_u^{1/2} = O_u^T D_u^{1/2} O_u \text{ and } \sum\nolimits_v^{1/2} = O_v^T D_v^{1/2} O_v$$

can be the positive square roots of $\Sigma_u$ and $\Sigma_v$. These decompositions can lead to the local color mapping:

$$T = \sum\nolimits_v^{1/2} \sum\nolimits_u^{-1/2} \tag{2}$$

Principal component analysis color transform can be selected to use the reference background patch as the source image and perform the color mapping from the optimal reference patch to the target image $\hat{B}^l$ as a foreground data edit (e.g., adjustment) followed, for example, by an alpha blend with the raw composite image.

At block 610, the process involves generating a refined image (e.g., the refined image 104). In some examples, the computing device can generate the refined image using the second image (e.g., the coarse-harmonized image) and the third image (e.g., the fine-harmonized image). The refined image can be generated by combining the second image and the third image, or by otherwise using the second image and the third image.

Upon generating the coarse-harmonized image and the fine-harmonized image, the coarse-harmonized image and the fine-harmonized image can be fused together in a refinement service, for example upon concatenating the global transform layer $I_g$, the local transform layer $I_l$, the mask layer $I_m$, and the feature mapping layer $F_{enc}=E(\tilde{I}^g, M^g)$ from the last global layer. In the refinement service, two convolutional layers can be used. Each convolutional layer can be followed by a batch normalization and an exponential linear unit activation. Additionally, the low-resolution image $I_r$ (now adjusted) can be enlarged by a blending layer to be the same or similar size as the original image $I_c$.

FIG. 7 illustrates another flowchart of a process 700 to generate a refined image using a set of machine-learning models. Some or all of the process 700, or any other processes described herein, or variations, and/or combinations thereof, may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium is non-transitory. In some examples, the process 700, or any operation thereof, can utilize the first machine-learning model 102a, the second machine-learning model 102b, the third machine-learning model 102c, or any other suitable device or model.

At block 702, the process involves receiving image data and a binary mask for an input image. In some examples, a computing device can receive the image data and the binary mask, the computing device can extract the image data and/or the binary mask from the input image, and the like. Additionally, the input image, or any data thereof, may be extracted from video data of a video that includes the input image.

The image data can include foreground data, background data, and other suitable data that can be used to indicate one or more portions of the input image. The foreground data can include pixels or other data in a foreground portion of the input image. The foreground portion may include one or more areas, one or more objects, or the like that are in-focus in the input image, that are intended to be viewed by a user of the input image, etc. The background data can include pixels or other data in a background portion of the input image. The background portion may include one or more areas, one or more objects, or the like that are not included in the foreground portion of the input image. Additionally, the binary mask may indicate the foreground portion of the input image. For example, the binary mask may include the one or more areas, the one or more objects, or the like included in the foreground portion of the input image. Additionally or alternatively, the binary mask may include boundaries (e.g., a local background area) that may approximately surround the foreground portion or the foreground portions of the input image.

At block 704, the process involves generating a low-resolution image based on the image data. The computing device, or any model or service thereof, can resize the input image to generate the low-resolution image. In some examples, the input image, and/or the image data thereof, can be resized $I_c \in R^{h \times w \times 3}$ to be the low-resolution image ($\tilde{I}_g, M_g$), which can be input into a model or service to be processed.

At block 706, the process involves applying a first machine-learning model (e.g., the first machine-learning model 102a) to the low-resolution image and to the binary mask. In some examples, the first machine-learning model may be or include a coarse harmonization network that can generate a coarse-harmonized image based on the low-resolution image and the binary mask. The coarse harmonization network can generate a second image (e.g., the coarse-harmonized image) that includes second image data having global contextual data for the second image.

To adjust the foreground data (e.g., pixels) of the input image according to the background data (e.g., pixels), coarse contextual data on global level can be determined, for example by using the low-resolution image and the binary mask. In a particular example, one or more deep-learning networks can extract global contextual information and can facilitate global harmonious editing for the foreground data. The coarse harmonization network can input the input image with the binary mask and can produce the coarse-harmonized image. In some examples, the first machine-learning model (e.g., the coarse-harmonized network) can be or include a U-Net alike generator with an encoder-decoder structure and with a skip connection between. Additionally, the style of the foreground image can be optimized to achieve a photo-realistic effect, iS$^2$AM can be used as a generator since iS$^2$AM can enable a blending layer to be better fitted for foreground data adjustment and response for the global-level coarse harmonization. The generator can be used to generate one or more outputs close to a down-sampled ground truth image. After providing the input into the generator, the harmonized output can be close to the down-sampled ground truth real image (e.g., $I^{lr} \in R^{h \times w \times 3}$ by minimizing the reconstruction loss $$L_g = \left\| \tilde{I}_g^{lr} - I^{lr} \right\|_1.$$

The harmonized results can be received and can include the global contextual statistics in low resolution.

At block 708, the process involves applying a second machine-learning model (e.g., the third machine-learning model 102c) to background data of the image data to generate a sparse feature. The second machine-learning model can receive or otherwise be applied to the set of reference patches. The reference patches received by the third machine-learning model may be associated with the background data. For example, the received reference patches may include pixels from the background data of the input image. Additionally, the third machine-learning model can transform each received patch of the set of reference patches into a gradient domain to generate a set of transformed reference patches, which may exist in the gradient domain. The second machine-learning model can extract the sparse feature from the set of transformed reference patches. In some examples, the extracted sparse feature may be or include a global sparse feature for the image data or any subset thereof such as the background image data.

For some input images, the background and associated background image data may be subject to various adjustments such as defocus blur, film grains, noise, and the like. The second machine-learning model can, by itself or in combination with other machine-learning models, automatically transfer and reproduce the adjustments across input images with a wide variety of backgrounds in high-quality. A basic physical relationship may exist between depth and defocus. A level of defocus blur and/or noise can be determined by the depth of field and other image parameters, for example substantially contemporaneously. The basic physical relationship can be applied, for example via the second machine-learning model, to estimate the detailed, texture-wise style information to mimic the texture details generated via manual adjustment of the input image.

The texture-wise sparse style transform can be used separately from a fine-harmonization network since sparse texture consistency may be a separate factor than color harmonization, though sparse style transform and color harmonization may share a similar 3D underlying image data for local reference candidate selection. Upon receiving the multi-scale nearby reference patches (e.g., the set of reference patches) from a depth map, the reference patches can be transformed into the gradient domain by a gradient covariance matrix. For the sparse style transform, a local reference patch can be $y_k$, and in the gradient domain, the $N^2 \times 2$ gradient matrix can be expressed as $$G_{y_i} = [P_h y_i, P_v y_i] \tag{3}$$

where $P_h$ and $P_v$ represent matrices of horizontal and vertical derivative operators, respectively. The $N^2 \times N^2$ matrices $P_h$ and $P_h$ can be or include Toeplitz matrices that can be derived from a gradient filter. The gradient covariance matrix $C_{y_i}$ for the local reference image patch y; can be defined as $$C_{y_i} = G_{y_i}^T G_{y_i} = \begin{bmatrix} y_i^T P_h^T P_h y_i, & y_i^T P_h^T P_v y_i \\ y_i^T P_v^T P_h y_i, & y_i^T P_v^T P_v y_i \end{bmatrix} \tag{4}$$

The sparse feature information can be extracted from the patch y; by the gradient matrix $G_{y_i}$ and the gradient covariance matrix $C_{y_i}$. In gradient domain, a dominant direction and an energy of a local patch can be measured using the eigenvectors and eigenvalues of $C_{y_i}$. The texture strength of the local patch can be represented by the trace of the covariance matrix $C_{y_i}$. Low-rank patches with a smaller trace can be identified as a patch with weak texture strength by thresholding the texture strength. Additionally, the low rank patches can include more sparse features than other patches in the image data like white noise and blur, etc.

A principal component analysis-based noise estimation algorithm can be executed to iteratively estimate the smallest noise standard deviation among the low-rank patches. The optimal noise level parameter n can be calculated by searching via a denoising algorithm such as BM3D or other suitable denoising algorithms. A least-squares approach can be used to estimate quadratic regression models. Additionally, candidate patches can be checked to see if the candidate patches have the minimum depth distance among the image. If not, the noise in the local image patch can be applied.

Accordingly, the sparse information of the background image can be further extracted from the frequency domain.

At block 710, the process involves generating a refined image (e.g., the refined image 104). In some examples, the computing device can generate the refined image using the second image (e.g., the coarse-harmonized image) and the sparse feature. The refined image can be generated by combining the second image and the sparse feature, or by otherwise using the second image and the sparse feature. In some examples, the refined image can be generated by combining the second image and the sparse feature with a third image (e.g., the fine-harmonized image).

Upon generating the coarse-harmonized image, the fine-harmonized image, and/or the sparse feature, the coarse-harmonized image and the fine-harmonized image can be fused together in a refinement service, for example upon concatenating the global transform layer $I_g$, the local transform layer $I_l$, the mask layer $I_m$, and the feature mapping layer $F_{enc}=E(\tilde{I}^g,M^g)$ from the last global layer. In the refinement service, two convolutional layers can be used. Each convolutional layer can be followed by a batch normalization and an exponential linear unit activation. Additionally, the low-resolution image $I_r$ (now adjusted) can be enlarged by a blending layer to be the same or similar size as the original image $I_c$.

Figure 8:
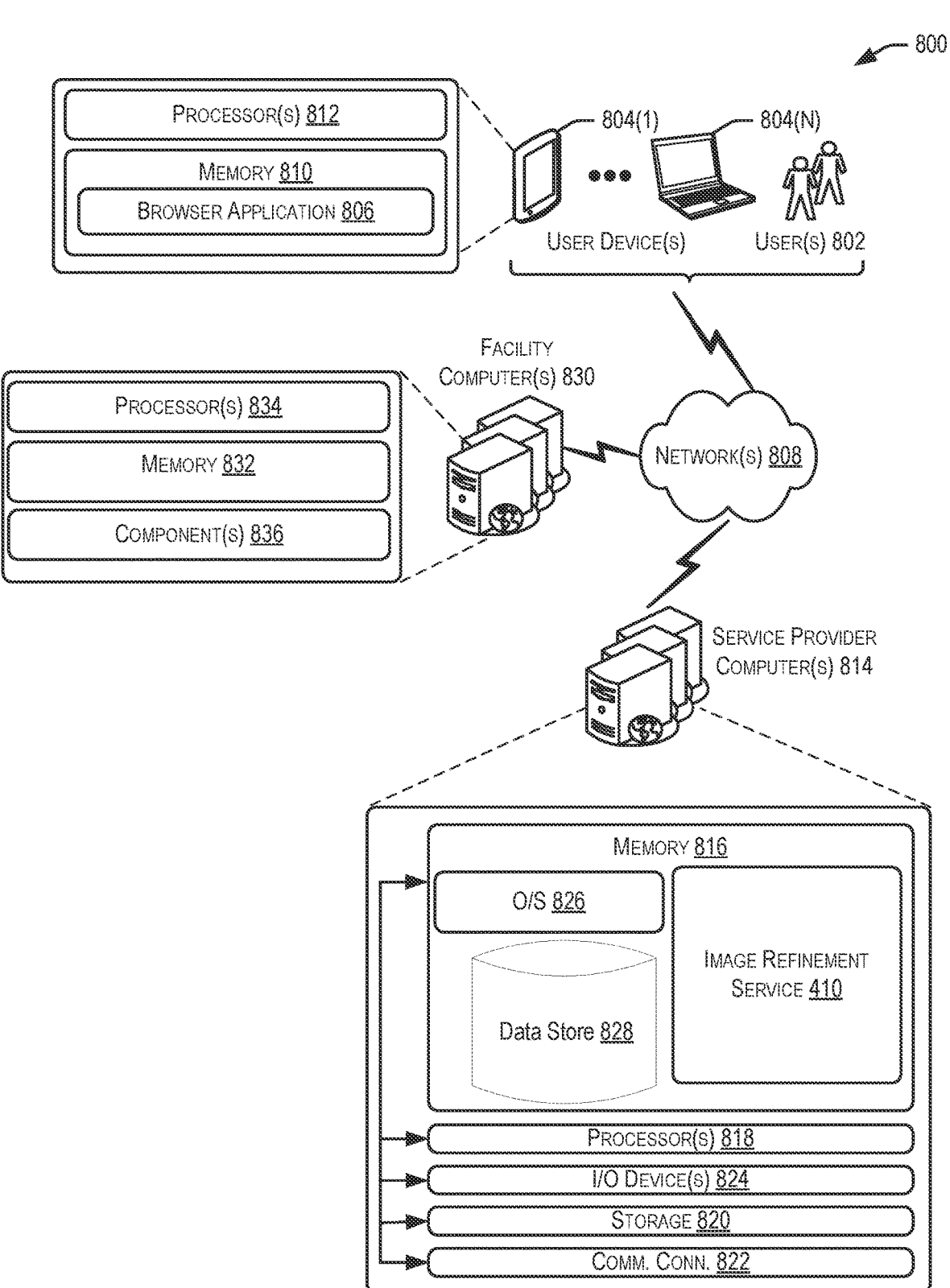
FIG. 8 illustrates an example architecture for an image refinement service that includes one or more service provider computers, a user device, and one or more facility computers in accordance with at least one embodiment.

FIG. 8 illustrates an example architecture 800 for an image refinement service (e.g., the image refinement service 410) that includes one or more service provider computers, a user device, and one or more facility computers in accordance with at least one embodiment. In architecture 800, one or more users 802 (e.g., image editors and/or entities associated with computer systems implementing the image refinement service) may utilize user computing devices 804(1)-(N) (collectively, user devices 804) to access a browser application 806 or a user interface (UI) accessible through the browser application 806 and via one or more networks 808, to receive image data, video data, or the like, which may be presented and interacted with via browser application 806 or the UI accessible through the browser application 806. The "browser application" 806 can be any browser control or native application that can access and display a network page or other information. A native application may include an application or program that has been developed for use on a particular platform, such as an operating system, or a particular device such as a particular type of mobile device.

In accordance with at least one embodiment, the user devices 804 may be configured for communicating with service provider computers 814 and facility computers 830 via networks 808. The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein. Additionally, the memory 810 may include one or more services for implementing the features described herein including the image refinement service 410.

The architecture 800 may also include one or more service provider computers 814 that may, in some examples, provide computing resources such as, but not limited to, client entities, low latency data storage, durable data storage, data access, management, virtualization, hosted computing environment or "cloud-based" solutions, image refinement feature implementation, etc. The service provider computers 814 may implement or be an example of the machine-learning model(s) or the service provider computer(s) (e.g., the computing devices) described herein with reference to FIGS. 1-7 and throughout the disclosure. The one or more service provider computers 814 may also be operable to provide site hosting, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represent the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.). In embodiments, the users 802 may communicate with the facility computers 830 via networks 808, and the facility computers 830 may communicate with the service provider computers 814 via networks 808. In some embodiments, the service provider computers 814 may communicate, via networks 808, with one or more third party computers (not pictured) to obtain data inputs for the various algorithms of the district generation features described herein. In accordance with at least one embodiment, the service provider computers 814 may receive video data, image data, mask data, or the like for generating a refined image.

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another. In embodiments, the service provider computers 814 may be in communication with one or more third party computers (not pictured) via networks 808 to receive or otherwise obtain data including video data, image data, mask data, and the like for generating the refined image.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program services, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the image refinement service 410. The architecture 800 includes facility computers 830. In embodiments, the service provider computers 814 and the image refinement service 410 may be configured to generate and transmit instructions, via networks 808, to components 836 in communication or otherwise associated with facility computers 830. For example, the instructions may be configured to activate or otherwise trigger components 836 for generating the refined image. The facility computers 830 may include at least one memory 832 and one or more processing units or processor(s) 834. The memory 832 may store program instructions (e.g., which may include one or more of the machine-learning models disclosed herein) that are loadable and executable on the processor(s) 834, as well as data generated during the execution of these programs. Depending on the configuration and type of the facility computers 830, the memory 832 may be volatile (such as random access memory (RAM)) and/or non-volatile (such as read-only memory (ROM), flash memory, etc.). The facility computers 830 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 830. In some implementations, the memory 1132 may include multiple different types of memory, such as static random access memory (SRAM), dynamic random access memory (DRAM), or ROM.

Turning to the contents of the memory 832 in more detail, the memory 832 may include an operating system and one or more application programs or services for implementing the features disclosed herein. Additionally, the memory 832 may include one or more services for implementing the features described herein including the image refinement service 410. In embodiments, the service provider computers 814 and the image refinement service 410 may generate refined images based on an input image and/or video data. The user device 804 and browser application 806 may be configured to update a presented user interface to present the refined images to user 802. In accordance with at least one embodiment, the image refinement service 410 may be configured to receive image data, data thereof (e.g., foreground image data, background image data, etc.), mask data, video data, and the like. In embodiments, some, a portion, or all of these input data may be stored and transmitted as video files or other files including video data. In accordance with at least one embodiment, each data input may be extracted from a video file. In embodiments, the image refinement service 410 may be configured to implement one or more machine-learning models, such as a coarse harmonization model, a fine harmonization model a sparse feature generation model, and the like to generate a coarse-harmonized image, a fine-harmonized image, and/or a sparse feature for generating the refined image.

The image refinement service 410 may be configured to generate and transmit a user interface or data objects for updating a user interface presented via browser application 806 and user device 804 for presenting the refined image, or components thereof (e.g., the coarse-harmonized image, the fine-harmonized image, etc.) to the user 802. Other graphical updates, feedback mechanisms, and data object generation associated with the image refinement features described herein may be implemented by the service provider computers 814 and the image refinement service 410.

Figure 9:
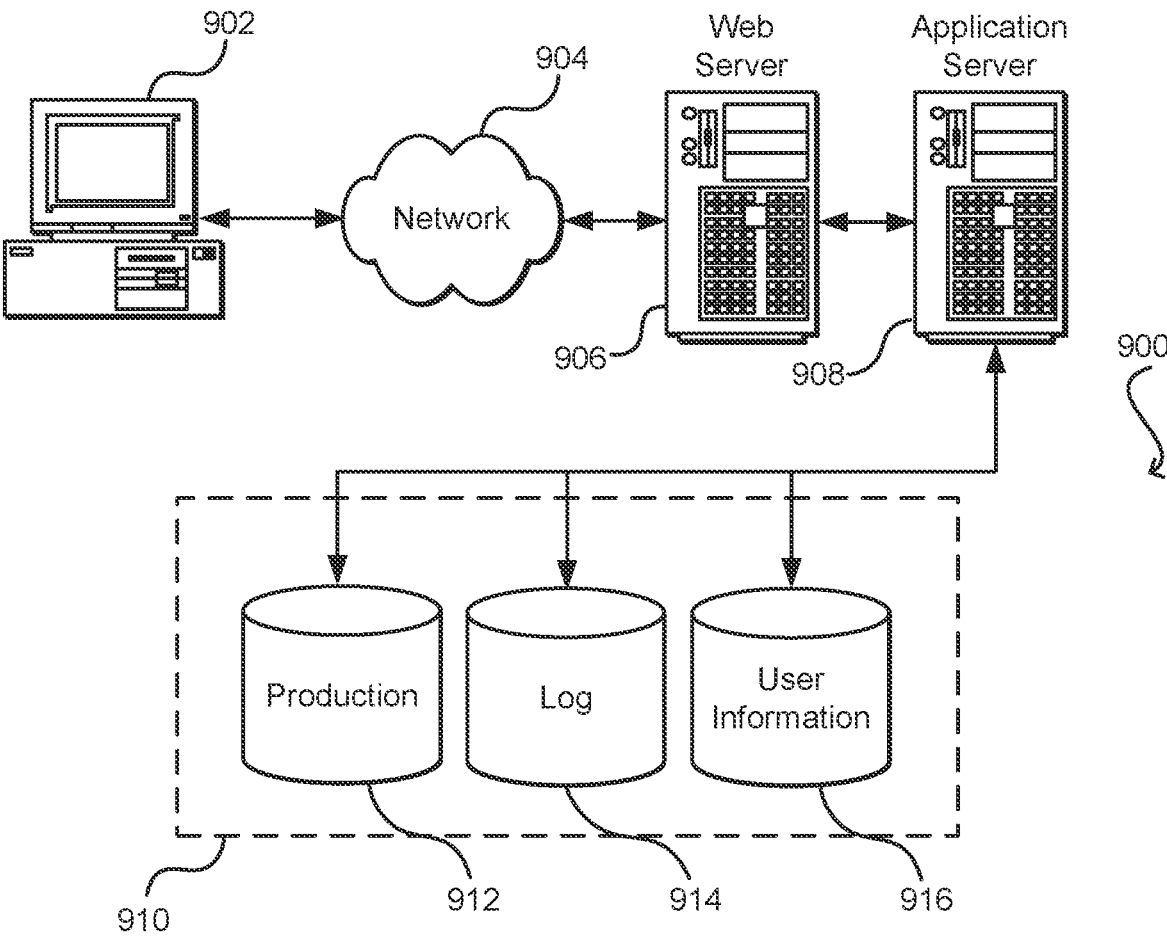
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program services, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving image data that includes foreground image data, background image data, and a binary mask that indicates the foreground image data;
   generating, based on the image data, a low-resolution image;
   applying a first machine-learning model to the low-resolution image and to the binary mask to generate a second image comprising second image data having global contextual data for the second image;
   applying a second machine-learning model to the image data to perform color mapping from an optimal patch to a masked foreground area of the foreground image data, the color mapping performed by:
      determining a local background area that includes a target local image for color mapping;
      generating a plurality of reference patches adjacent to the local background area, each reference patch of the plurality of reference patches extending, from the local background area, in a different direction from a different reference patch of the plurality of reference patches;
      selecting, using a depth-estimation model and from among one or more patches of the plurality of reference patches, the optimal patch that corresponds to the foreground image data; and
      applying, using a patch from the background image data as reference, the color mapping from the optimal patch to the masked foreground area to generate a third image;
   applying a third machine-learning model to the background image data to generate a sparse feature by:
      receiving the plurality of reference patches;
      transforming each reference patch of the plurality of reference patches into a gradient domain to generate a plurality of transformed reference patches; and
      extracting the sparse feature from the plurality of transformed reference patches; and
      generating a refined image using the second image, the third image, and the sparse feature.

2. The computer-implemented method of claim 1, wherein:
   determining the local background area that includes a target local image for color mapping comprises applying blob detection to the binary mask to generate the local background area; and
   generating a plurality of reference patches adjacent to the local background area comprises (i) generating a first plurality of reference patches internal with respect to the local background area and (ii) generating a second plurality of reference patches external with respect to the local background area.

3. The computer-implemented method of claim 1, wherein selecting the optimal patch comprises:
   generating, by the second machine-learning model, a depth map of the image data, the depth map comprising a depth-guided multi-scale local color transfer model;
   extracting one or more key points of the depth map, wherein each key point of the one or more key points corresponds to the foreground image data;
   generating a ranked patch list of the plurality of reference patches, wherein the ranked patch list orders the plurality of reference patches by applying a filtering mechanism to brightness; and
   determining, based on the key points and the ranked patch list, the optimal patch.

4. The computer-implemented method of claim 1, wherein the color mapping involves combining two or more matrices, wherein the two or more matrices comprise at least one pair of orthogonal matrices and at least one pair of diagonal matrices.

5. The computer-implemented method of claim 1, further comprising receiving a video comprising video data, wherein receiving the image data comprises extracting the image data from the video data.

6. A computer-implemented method, comprising:
   receiving image data that includes foreground image data, background image data, and a binary mask that indicates the foreground image data;
   generating, based on the image data, a low-resolution image;
   applying a first machine-learning model to the low-resolution image and to the binary mask to generate a second image comprising second image data having global contextual data for the second image;
   applying a second machine-learning model to the image data to perform color mapping from an optimal patch to a masked foreground area of the foreground image data, the color mapping performed by:
      determining a local background area that includes a target local image for color mapping;
      generating a plurality of reference patches adjacent to the local background area, each reference patch of the plurality of reference patches extending, from the local background area, in a different direction from a different reference patch of the plurality of reference patches;
      selecting, using a depth-estimation model and from among one or more patches of the plurality of reference patches, the optimal patch that corresponds to the foreground image data; and
      applying, using a patch from the background image data as reference, the color mapping from the optimal patch to the masked foreground area to generate a third image; and
   generating a refined image using the second image and the third image.

7. The computer-implemented method of claim 6, further comprising:
   applying a third machine-learning model to the background image data to generate a sparse feature by:

receiving the plurality of reference patches;

transforming each reference patch of the plurality of reference patches into a gradient domain to generate a plurality of transformed reference patches; and extracting the sparse feature from the plurality of transformed reference patches.

8. The computer-implemented method of claim 7, wherein generating the refined image comprises generating the refined image using the second image, the third image, and the sparse feature.

9. The computer-implemented method of claim 8, wherein the second image comprises a coarse harmonized image having coarse harmonized image data, and wherein the third image comprises a fine harmonized image having fine harmonized image data.

10. The computer-implemented method of claim 6, wherein selecting the optimal patch comprises:

generating, by the second machine-learning model, a depth map of the image data;

extracting one or more key points of the depth map, wherein each key point of the one or more key points corresponds to the foreground image data;

generating a ranked patch list of the plurality of reference patches, wherein the ranked patch list orders the plurality of reference patches by a brightness of gray-scale coloring; and determining, based on the key points and the ranked patch list, the optimal patch.

11. The computer-implemented method of claim 6, further comprising receiving a video comprising video data, wherein receiving the image data comprises extracting the image data from the video data.

12. The computer-implemented method of claim 6, wherein the second image is a coarse-harmonized image, wherein the third image is a fine-harmonized image, and wherein generating the refined image using the second image and the third image comprises concatenating the coarse-harmonized image and the fine-harmonized image using a refinement service that comprises two convolutional layers.

13. A computer system comprising:

a memory configured to store computer-executable instructions; and a processor in communication with the memory configured to execute the computer-executable instructions to at least:

receive image data that includes foreground image data, background image data, and a binary mask that indicates the foreground image data;

generate, based on the image data, a low-resolution image;

apply a first machine-learning model to the low-resolution image and to the binary mask to generate a second image comprising second image data having global contextual data for the second image;

apply a second machine-learning model to the background image data, the second machine-learning model configured to generate a sparse feature by:

receiving a plurality of reference patches;

transforming each reference patch of the plurality of reference patches into a gradient domain to generate a plurality of transformed reference patches; and extracting the sparse feature from the plurality of transformed reference patches; and generate a refined image using the second image and the sparse feature.

14. The computer system of claim 13, wherein the processor is configured to execute the computer-executable instructions to additionally apply a third machine-learning model to the image data to perform color mapping from an optimal patch to a masked foreground area of the foreground image data.

15. The computer system of claim 14, wherein the color mapping configured to be performed by:

determining the masked foreground area that includes a target local image for color mapping;

generating a plurality of reference patches adjacent to the masked foreground area, each reference patch of the plurality of reference patches extending in a different direction from the masked foreground area than a different reference patch of the plurality of reference patches;

selecting, using a depth-estimation model and from among one or more patches of the plurality of reference patches, the optimal patch that corresponds to the foreground image data; and applying, using a patch from the background image data as reference, the color mapping from the optimal patch to the masked foreground area to generate a third image.

16. The computer system of claim 15, wherein generate the refined image comprises generate the refined image using the second image, the third image, and the sparse feature.

17. The computer system of claim 15, wherein the processor is further configured to execute the computer-executable instructions to:

determine a local background area that includes a target local image for color mapping comprises applying blob detection to the binary mask to generate the local background area; and generate a plurality of reference patches adjacent to the local background area by (i) generating a first plurality of reference patches internal with respect to the local background area and (ii) generating a second plurality of reference patches external with respect to the local background area.

18. The computer system of claim 15, wherein selecting the optimal patch comprises:

generating, by the second machine-learning model, a depth map of the image data;

extracting one or more key points of the depth map, wherein each key point of the one or more key points corresponds to the foreground image data;

generating a ranked patch list of the plurality of reference patches, wherein the ranked patch list orders the plurality of reference patches by a brightness of gray-scale coloring; and determining, based on the key points and the ranked patch list, the optimal patch.

19. The computer system of claim 14, wherein the color mapping is configured to involve combining two or more matrices, wherein the two or more matrices comprise at least one pair of orthogonal matrices and at least one pair of diagonal matrices.

20. The computer system of claim 13, wherein the processor is configured to execute the computer-executable instructions to additionally receive a video comprising video data, wherein receive the image data comprises extracting the image data from the video data.

* * * * *